US005682993A

United States Patent [19]
Song

[11] Patent Number: 5,682,993
[45] Date of Patent: Nov. 4, 1997

[54] MULTIPURPOSE COVER FOR A NOTEBOOK PERSONAL COMPUTER

[75] Inventor: Kwang-ho Song, Seoul, Rep. of Korea

[73] Assignee: SamSung Electronics Co., Ltd., Suwon, Rep. of Korea

[21] Appl. No.: 567,487

[22] Filed: Dec. 5, 1995

[30] Foreign Application Priority Data

Dec. 8, 1994 [KR] Rep. of Korea ................ 94-33284 U

[51] Int. Cl.$^6$ ................................................. B65D 85/38
[52] U.S. Cl. ........................ 206/320; 206/573; 361/683; 364/708.1
[58] Field of Search ............................. 206/305, 320, 206/521, 523, 588, 591; 190/102, 111, 115; 361/683; 364/708.1

[56] References Cited

U.S. PATENT DOCUMENTS

| D. 323,929 | 2/1992 | Hodson . | |
|---|---|---|---|
| D. 346,391 | 4/1994 | Shoaf . | |
| D. 358,483 | 5/1995 | Cross et al. . | |
| D. 360,075 | 7/1995 | Cross et al. . | |
| 2,228,493 | 1/1941 | Will | 206/523 X |
| 2,282,908 | 5/1942 | Thompson | 206/523 |
| 4,790,431 | 12/1988 | Reel et al. | 206/305 |
| 4,803,652 | 2/1989 | Maeser et al. | 364/708.1 |
| 5,002,184 | 3/1991 | Lloyd | 206/305 |
| 5,010,988 | 4/1991 | Brown | 206/320 X |
| 5,060,152 | 10/1991 | Maeser et al. | 361/683 X |
| 5,214,574 | 5/1993 | Chang . | |
| 5,217,119 | 6/1993 | Hollingsworth . | |
| 5,379,893 | 1/1995 | Ruiz | 206/320 |
| 5,445,266 | 8/1995 | Prete et al. . | |
| 5,555,489 | 9/1996 | Keskinen | 361/683 |

OTHER PUBLICATIONS

IBM Technical Disclosure Bulletin, vol. 37 No. 06B Jun. 1994.
IBM Technical Disclosure Bulletin, vol. 37 No. 07 Jul. 1994.

*Primary Examiner*—Bryon P. Gehman
*Attorney, Agent, or Firm*—Robert E. Bushnell, Esq.

[57] ABSTRACT

A multipurpose cover for transporting and protecting a portable personal computer is formed by upper and lower rectangular trays joined by a zipper. The computer remains attached to and partially enclosed by the trays while being operated, and may be conveniently connected to an external printer, monitor or other peripheral device through apertures formed in at least one of the rectangular trays. Elastic flaps equipped with snap fasteners cover the apertures when not in use, and rubber struts may be attached to the bottom of the lower tray to control the angle of keyboard. A company name or logo may be embossed on an external surface of the cover for advertising purposes.

11 Claims, 3 Drawing Sheets

MULTIPURPOSE COVER FOR A NOTEBOOK PERSONAL COMPUTER

CROSS-REFERENCE TO RELATED APPLICATIONS

This application makes reference to, incorporates the same herein and claims all benefits accruing under 35 U.S.C. §119 from an application entitled MULTIPURPOSE COVER FOR A NOTEBOOK PERSONAL COMPUTER earlier filed in the Koran Industrial Property Office on Dec. 8, 1994, and duly assigned Ser. No. 33284/1994 by that Office.

BACKGROUND OF THE INVENTION

1. Field of the Invention

The present invention relates to improvements in covers for carrying and protecting a laptop, notebook, sub-notebook or the like portable personal computer (PC), and more particularly to a multipurpose cover enabling safe transporting of a notebook PC under wet conditions while allowing the computer to be operated without being removed from the cover.

Conventional portable computer covers are primarily intended to protect the computer from mechanical shock while being transported. For example, a Carrying Case for Laptop Computer disclosed in U.S. Pat. No. 5,217,119 to Hollingsworth provides a main compartment having both a handle and shoulder strap attached to a flap enclosing the top of the compartment. A padded cradle elastically suspends the computer above the compartment floor to absorb impacts and kinetic energy if the case is dropped. Generally, the portable computer must be completely removed from a conventional cover to be operated, then replaced into the cover after use.

U.S. Pat. Nos. 358,483 and 360,075 to Cross et al. illustrate computer carrying cases, which appear to allow the computer to be operated from within the case by providing a zipper extending along three sides of a hinged front panel closing the main compartment. The side panels help retain the computer within the case when the front panel is opened, but block connection of an external power supply and peripheral devices to the computer.

In U.S. Pat. No. 5,214,574, Chang discloses a supplemental protective case for transporting a portable computer, formed by a pair of pivotally joined shells of impact-resistant aluminum or plastic. The computer can be operated while remaining within a tray formed by one of the shells, but various openings in the side walls providing access to a disk drive and serial/parallel ports are not closeable to protect the computer from dust and moisture. Furthermore, when the computer is laid on a surface for use while still within the case, a user can not control the angle of the keyboard.

SUMMARY OF THE INVENTION

Accordingly, it is an object of the present invention to provide a multipurpose cover for a portable personal computer.

Another object is to provide a substantially waterproof cover for transporting a portable personal computer and protecting against mechanical shock.

Still another object is to provide a cover for a portable personal computer, which permits the computer to be operated and connected to peripheral devices while being retained within the cover.

Another object is to enable the angle of the keyboard to be adjusted when the portable computer is operated while remaining in the cover.

Yet another object is to provide advertising for a company by writing the company name on the external surface of the PC cover.

These and other objects may be achieved with multipurpose portable computer cover constructed according to the principles of the present invention, having an attached handle to transport the computer conveniently, a zipper for conveniently opening and closing the cover, an aperture in the cover formed by an elastic flap closeable by a snap fastener when not in use, for connecting a peripheral device to the computer, a rubber strut rotating within a slot for controlling the keyboard angle, and a plurality of clips for fixing the cover to a housing of the portable computer.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
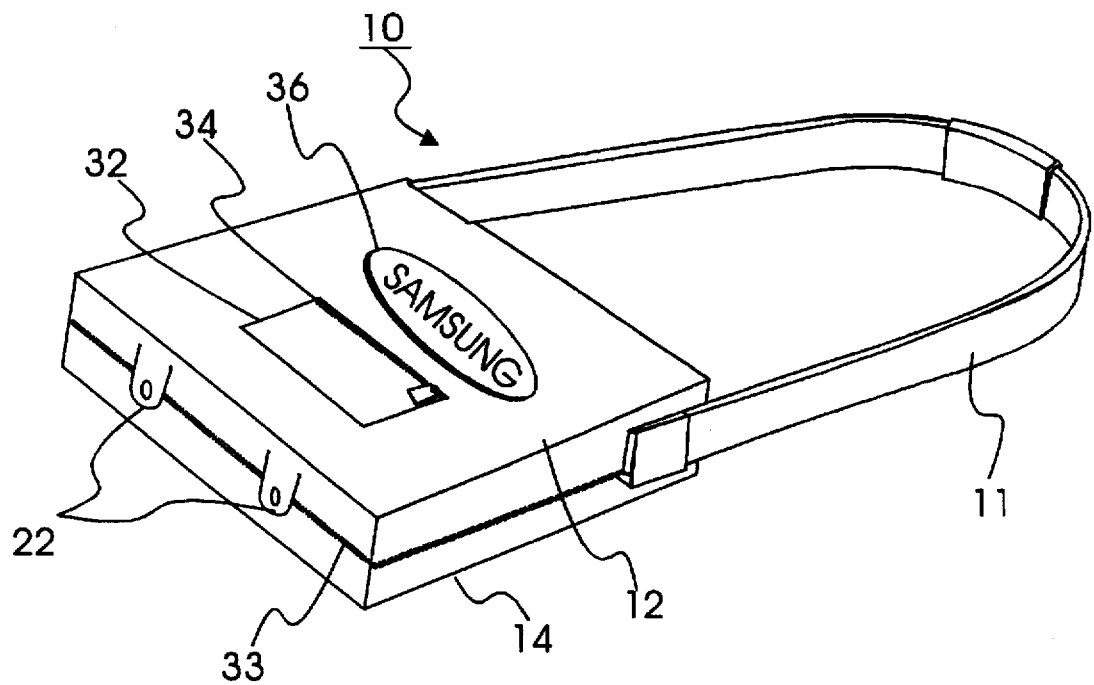
FIG. 1 illustrates a perspective view of a multipurpose cover for a notebook PC according to a preferred embodiment of the invention.

Turning now to the drawings and referring first to FIG. 1, a multipurpose portable computer cover 10 is formed by rectangular upper tray 12 and lower tray 14, joinable along at least three sides by a zipper 33 for opening and closing the multipurpose cover 10. A handle 11 attached to opposite sides of either tray may be constructed of sufficient length to be comfortably worn over one shoulder for carrying convenience. A pair of snap fasteners 22 extending from a front side of the upper tray 12 may be attached to the lower tray 14 to function as a backup closure in case the user carelessly leaves the zipper 33 partially open while transporting the computer.

A small secondary zipper 34 provides access through the upper tray 12 for inserting a diskette or small PC accessory into a pocket 32 of the multipurpose cover 10. Also, a logo 36 may be engraved or molded onto the upper tray 12 to advertise the name of a manufacturer or owner of the portable computer.

Figure 2:
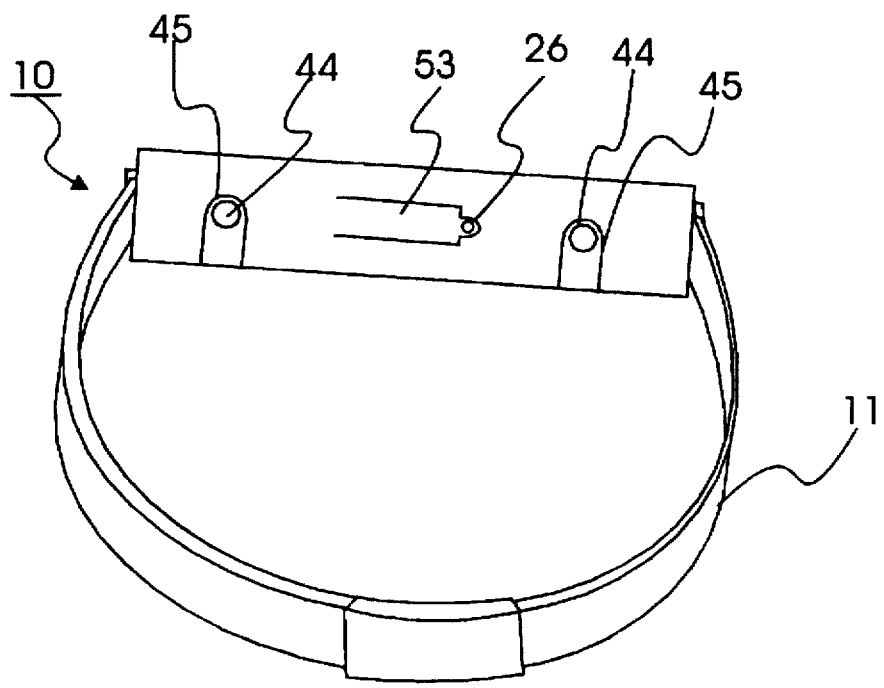
FIG. 2 illustrates a rear view of a multipurpose cover for a notebook PC according to a preferred embodiment of the invention.

Portable computers are generally provided with electrical connectors along a rear edge of the computer housing, such as a monitor port and serial and parallel input/output ports. Referring to FIG. 2, the present invention provides at least one corresponding aperture in upper tray 12 and/or lower tray 14, through which a peripheral device such as a printer or monitor may be connected to the computer without entirely removing the computer from the multipurpose cover 10. The apertures are preferably created by cutting a portion of the cover to form an elastic rubber flap 53 along a back side wall adjacent one or more electrical connectors. In order to protect the computer and particularly the electrical connectors from dust and moisture when not in use, each flap 53 may be held closed against adjacent portions of the cover by a snap fastener 26 attached to a free edge of the flap.

Figure 3:
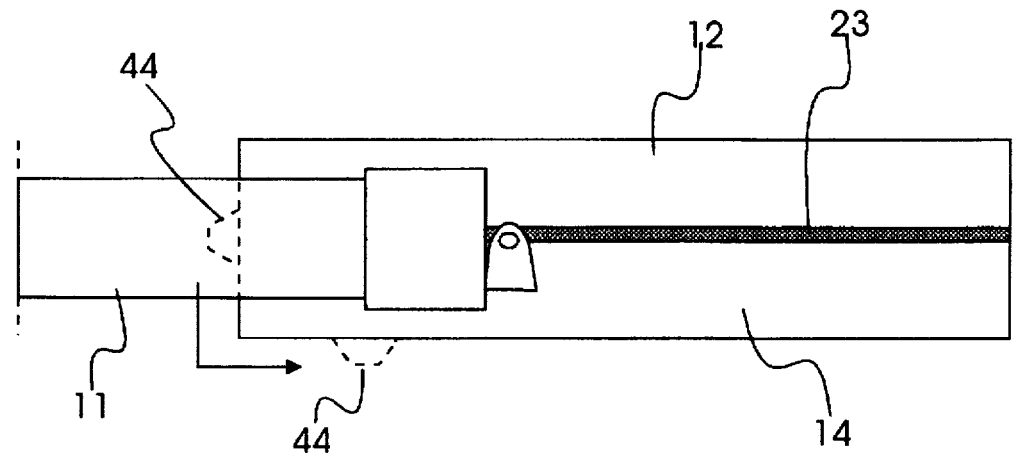
FIG. 3 illustrates a left side view of multipurpose cover for a notebook PC according to a preferred embodiment of the invention.

A pair of rubber strut legs 44 are normally retained at the rear side of the multipurpose cover 10 within slots 45 (FIG. 2), but may be rotated in the direction of the arrow shown in FIG. 3 to the bottom surface of lower tray 14.

Figure 4:
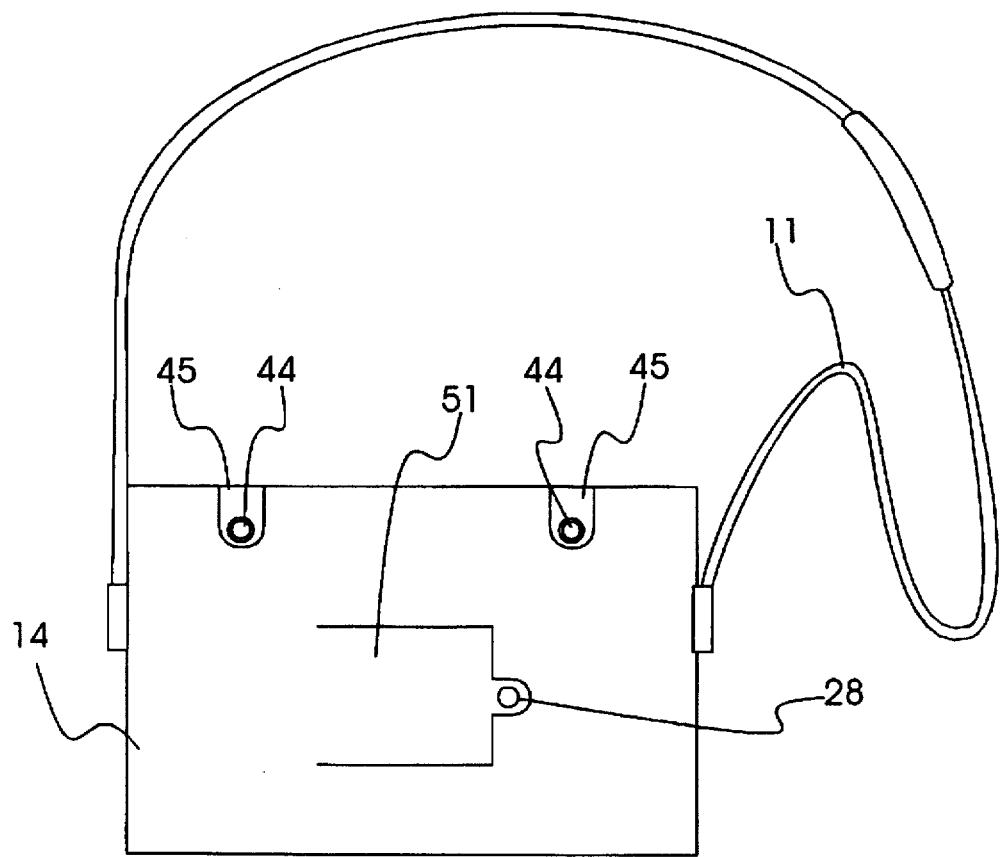
FIG. 4 illustrates a bottom view of a multipurpose cover for a notebook PC according to a preferred embodiment of the invention.

FIG. 4 illustrates the position of rubber strut legs 44 within slots 45 along the bottom of lower tray 14 raise the angle of a computer keyboard retained within the multipurpose cover 10 relative to a table or other surface on which it is supported. An aperture for installing a battery or connecting an external power supply to the computer without removing the cover may be formed in the bottom of lower tray 14 and provided with an elastic flap 51 having a snap fastener 28 attached to a free end.

Figure 5:
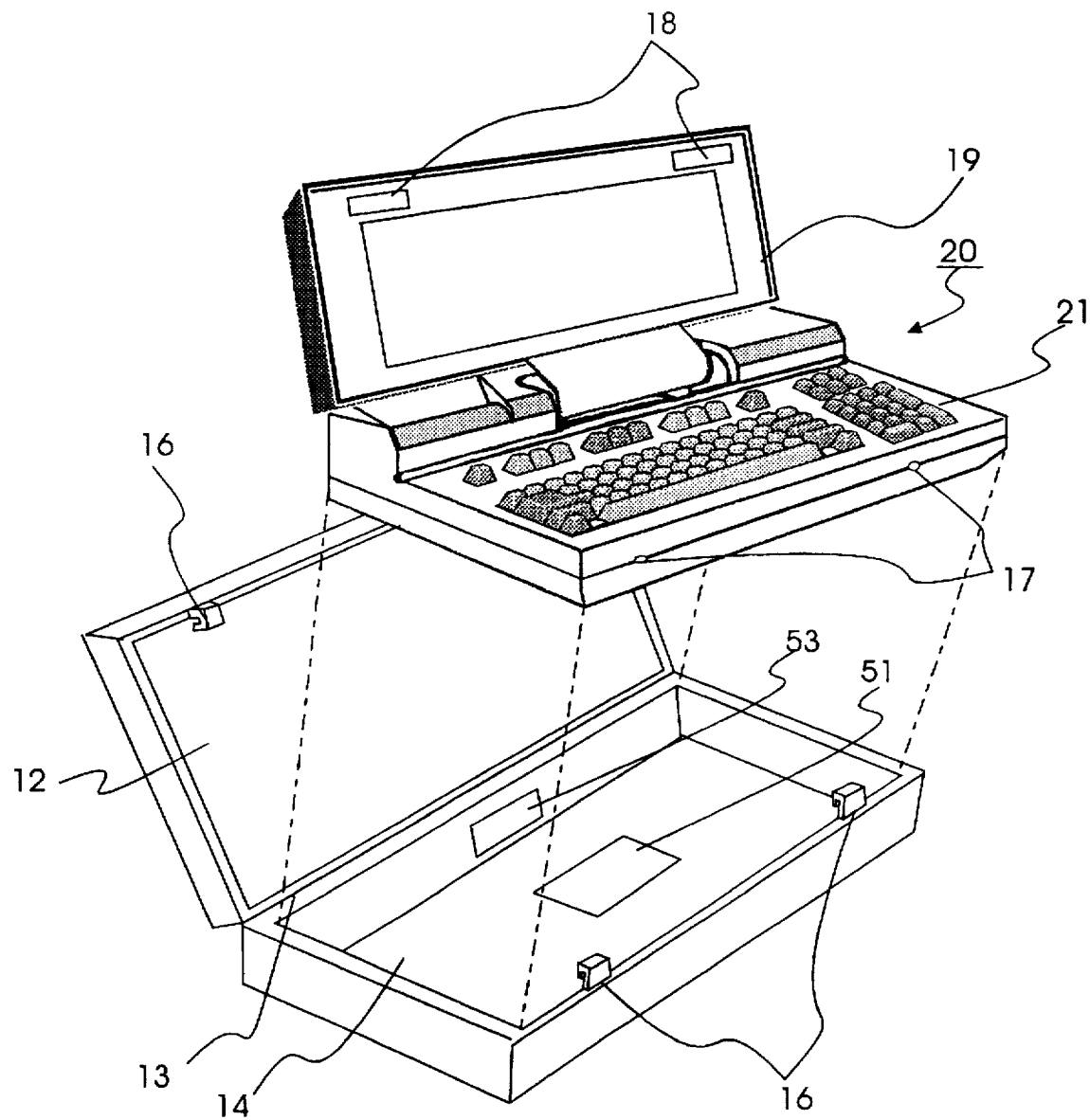
FIG. 5 is a perspective view illustrating placement of a notebook PC inside a multipurpose cover constructed according to a preferred embodiment of the invention.

FIG. 5 illustrates a multipurpose cover 10 constructed according to the principles of the present invention.

A plurality of clips 16 are attached to opposite edges of the upper tray 12 and lower tray 14 for engaging small grooves 17 and 18 hollowed into the housing 20 of a portable computer to affix the cover 10 to the housing. When the upper tray 12 of the multipurpose cover 10 is lifted, a hinged display screen customarily covering the computer keyboard is simultaneously opened by the clips 16 engaging grooves 17 and 18 formed in the computer housing 20.

A manner of using the multipurpose cover for a portable personal computer according to a preferred embodiment of the invention is hereinafter described. First, the pair of snap fasteners 22 located on the front side of the multipurpose cover 10 and the zipper 33 are undone. Accordingly, Rubber strut legs 44 located on the rear side of the multipurpose cover of the portable computer is shifted with the slots 45 along the bottom face and controlling the height of the keyboard. In case connecting a printer or a peripheral device to the PC, it is just done with opening the snap fastener 26 and if the use of PC is finished, it is just done by locking the snap fastener 26 of flap 53.

The invention has the effects of permitting a portable computer to be operated while remaining attached to the cover, controlling the keyboard angle by rotating rubber strut legs within a pair of slots formed in the cover, enabling an external printer, monitor or other device to be conveniently connected to the portable computer without removing the cover by providing apertures in the cover, and providing dust, moisture, and shock protection for the portable computer by equipping the cover with a zipper and elastic flaps having snap fasteners to allow the computer to be completely enclosed while not in use.

While I have shown and described certain present preferred embodiments of the invention and have illustrated certain present preferred methods of practicing the same it is to be distinctly understood that the invention is not limited thereto but may be otherwise variously embodied and practiced within the scope of the following claims.

What is claimed is:

1. A multipurpose cover for a notebook computer, comprising: a container having an upper portion and a lower portion;

a flexible strap attached to said upper portion;

a snap fastener accommodating operational access through an end wall of said container positioned between said upper portion and said lower portion of a peripheral device to the notebook computer and protecting the notebook computer while the notebook computer is not in use;

a peripheral zipper positioned between said upper portion and said lower portion to alternately establish and release a continuous peripheral connection between said upper portion and said lower portion;

a strut rotatably attached to said container with freedom to travel between one side of an undersurface of said lower portion and said end-wall of said container;

an eyelet attaching said strut to said end-wall while accommodating said freedom to travel; and means for releasably fastening said upper portion of said cover to the notebook computer and means for releasably fastening said lower portion of said cover to the notebook computer.

2. A multipurpose cover for a notebook computer as defined in claim 1, comprising a second zipper providing access to the notebook computer through said upper portion of said container independently of access to the notebook computer provided by said peripheral zipper.

3. A multipurpose cover for a notebook computer as defined in claim 1, wherein said means for releasably fastening said upper portion of the cover to the notebook computer and said means for releasably fastening said lower portion of said cover to the notebook computer each comprise a pair of clips on opposite edges of said tray portion disposed to matingly engage with corresponding grooves formed in the notebook computer, said pair of clips fastening together said upper and lower portions of said cover to the notebook computer.

4. A multipurpose cover, comprising:

a rectangular lower tray defined by a base wall and a first plurality of side walls, one of said base wall and said first plurality of walls having an aperture permitting access though said one of said base wall and said first plurality of walls, said aperture being covered by a flap attachable to said one of said base wall and said first plurality of walls by a snap fastener;

a rectangular upper tray defined by a base wall and a second plurality of side walls, said upper tray being pivotally connected along one of said second plurality of walls to a corresponding wall of said lower tray;

a zipper extending along an edge of said side walls of said upper and lower trays and joining said trays to form an enclosure completely encasing a computer; and a plurality of clips disposed along said side walls of said upper and lower trays engaging grooves formed in exterior surfaces of the computer and securely gasping the computer within corresponding receptacles provided by said upper and lower trays.

5. A multipurpose cover as recited in claim 4, comprised of said upper and lower trays being molded from an elastic compound, and said flap being formed by cutting through said compound along an open line.

6. A multipurpose cover as recited in claim 5, comprised of said elastic compound being impervious to water and said cover forming a waterproof enclosure when said zipper is fully engaged and said flap is attached to said one of said base wall and said first plurality of walls by said snap fastener.

7. A multipurpose cover as recited in claim 4, further comprising a pair of legs rotatably attached to said lower tray for adjusting an angle of orientation of said base wall relative to a supporting surface located beneath said lower tray.

8. A multipurpose cover as recited in claim 4, further comprising a supplemental zipper opening and closing an aperture formed in said upper tray and providing access accommodating insertion of a computer accessory to the computer through said multipurpose cover.

9. A multipurpose cover as recited in claim 4, comprised of said plurality of clips being attached to opposite ends of corresponding side walls forming said upper and lower trays.

10. A multipurpose cover, comprising:

upper and lower substantially rectangular trays, each tray having a plurality of peripheral walls extending at an angle from a base wall, said upper and lower trays rotatable attached together to permit transition between a closed position forming an enclosure and an open position;

a handle attached to one of said rectangular trays for conveniently transporting a portable computer enclosed between said upper and lower rectangular trays;

a snap fastener attached to an elastic flap covering an aperture in one of said rectangular trays, said aperture providing access for connecting a peripheral device to the portable computer while the portable computer is at least partially enclosed by said one of said rectangular trays, said elastic flap protecting the portable computer when covering said aperture;

a zipper attached to adjacent side walls of each of said upper and lower rectangular trays for joining opposing side walls of said trays to form an enclosure;

a plurality of clips disposed along said side walls of said upper and lower rectangular trays, a housing for the portable computer having a keyboard portion rotatably attached to a display portion, a clip of said lower tray engaging the keyboard portion and a clip of said upper tray engaging the display portion to affix the cover to the portable computer and rotate the keyboard and display portions relative to one another simultaneous with the opening of said upper and lower trays; and a strut leg slidable within a slot in said base wall of said lower rectangular tray for adjusting an angle of orientation of said keyboard of said notebook computer partially encased by said lower rectangular tray.

11. A multipurpose cover as recited in claim 10, comprising said snap fastener being attached to an elastic flap provided to cover apertures formed in said base wall and a peripheral wall of said lower rectangular tray.

* * * * *